United States Patent [19]

McSherry

[11] 4,221,154

[45] Sep. 9, 1980

[54] FASTENING ELEMENT WITH ANTI-JACKING DEVICE

[75] Inventor: Thomas W. McSherry, Floral Park, N.Y.

[73] Assignee: Mechanical Plastics Corp., Pleasantville, N.Y.

[21] Appl. No.: 930,133

[22] Filed: Aug. 2, 1978

[51] Int. Cl.² .............................................. F16B 13/08
[52] U.S. Cl. ...................................... 85/80; 151/41.75
[58] Field of Search ................. 85/80, 84, 83, 82, 3 S, 85/3 R, 3 K, 73-77; 151/41.75; 248/220.3, 220.4, 221.1, 221.2; 52/617, 36, 789, 703-706; 24/73 P, 73 PF

[56] References Cited

U.S. PATENT DOCUMENTS

| | | | |
|---|---|---|---|
| 3,651,734 | 3/1972 | McSherry | 85/82 X |
| 3,662,644 | 5/1972 | Flesch et al. | 85/84 |
| 3,836,704 | 9/1974 | Coules | 24/73 P X |

FOREIGN PATENT DOCUMENTS 2741061 3/1978 Fed. Rep. of Germany .............. 85/80

Primary Examiner—Ramon S. Britts
Attorney, Agent, or Firm—Pennie & Edmonds

[57] ABSTRACT

A fastening arrangement and fastening element for fastening together two or more members, at least one of which is concave with respect to the others. Fastened within an aperture in at least one of the members is a channeled fastening element with a longitudinally extending anti-jacking member and one or more additional members are attached to the fastening element by an elongated retaining element extending into the fastening element channel and locking therewithin. The anti-jacking member is proportioned to substantially extend between the concave member and the surface of the adjacent member to prevent jacking of the fastening element from the aperture.

7 Claims, 4 Drawing Figures

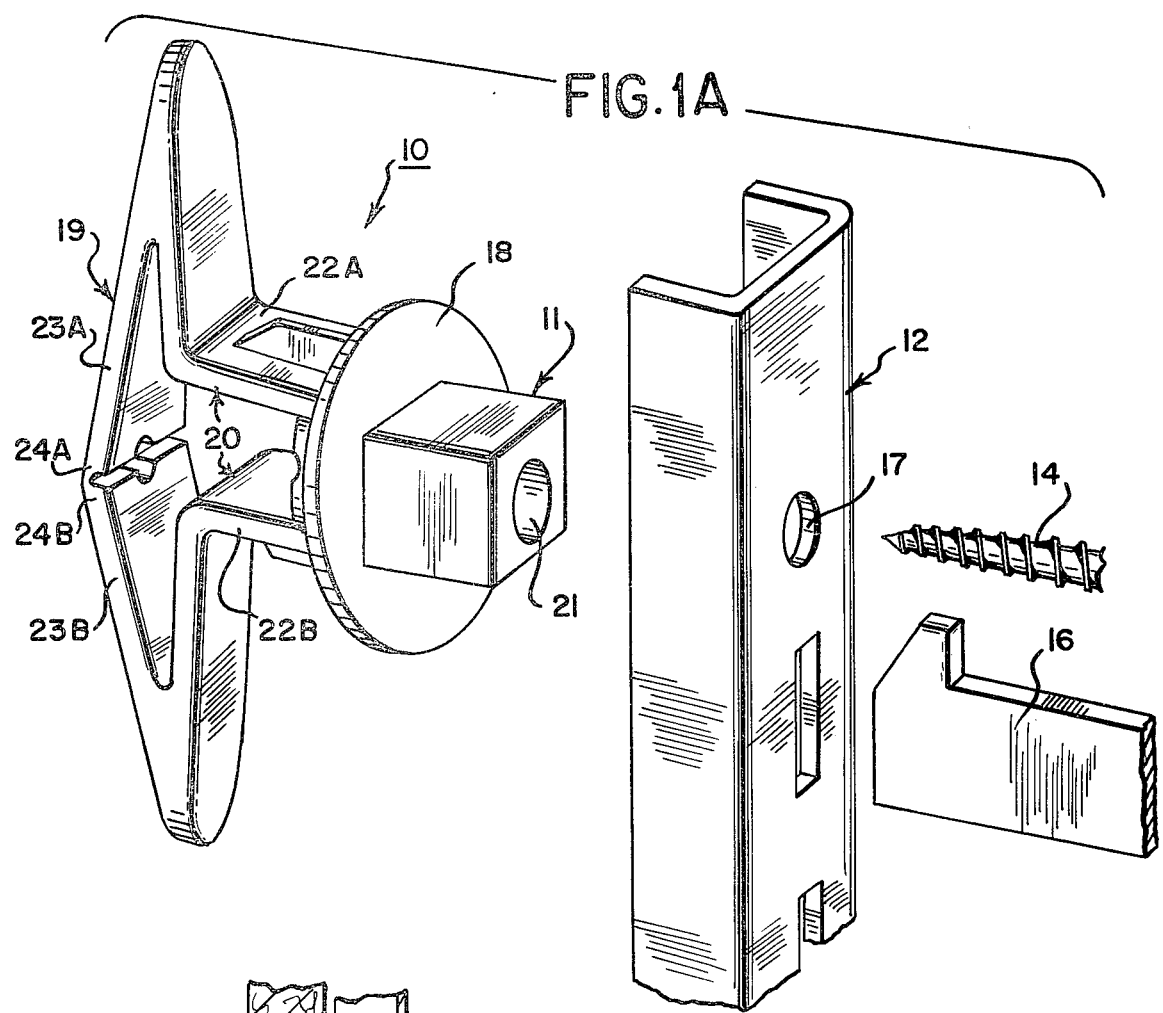
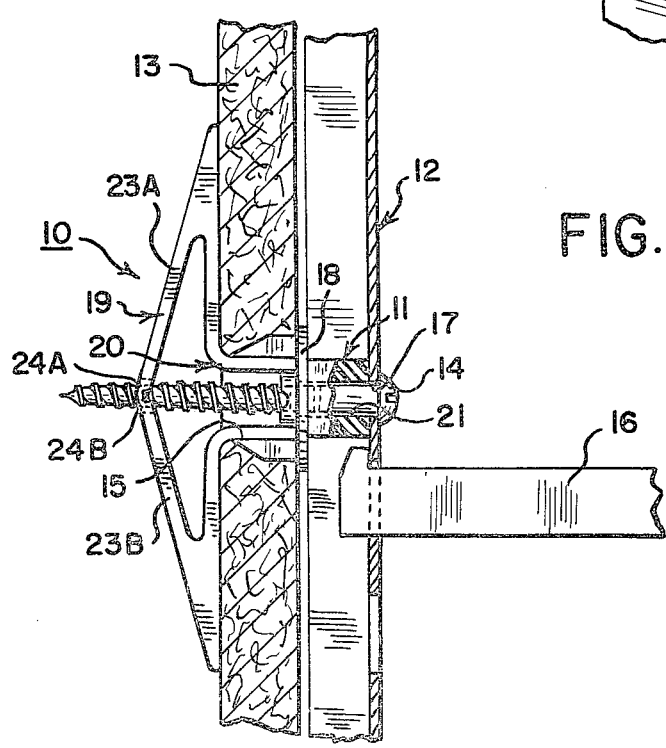

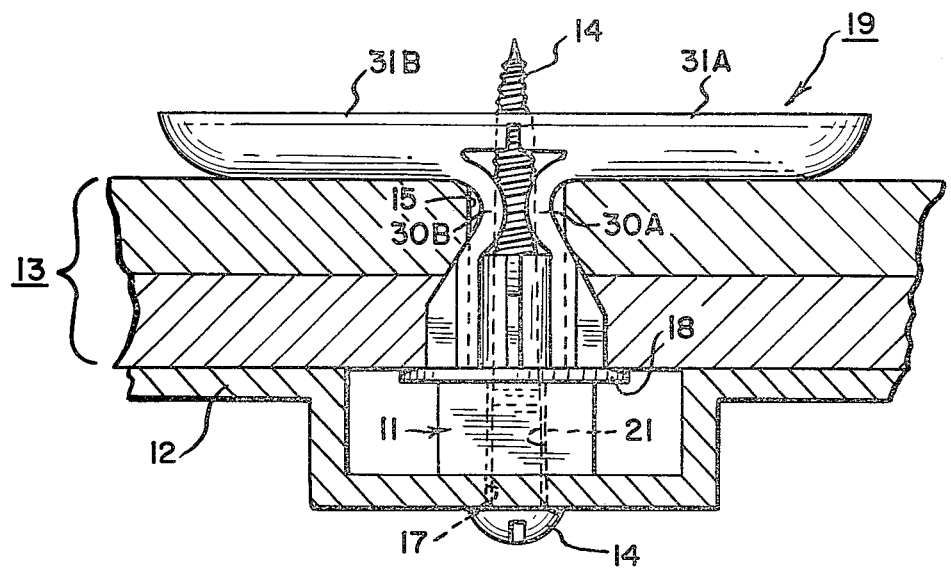
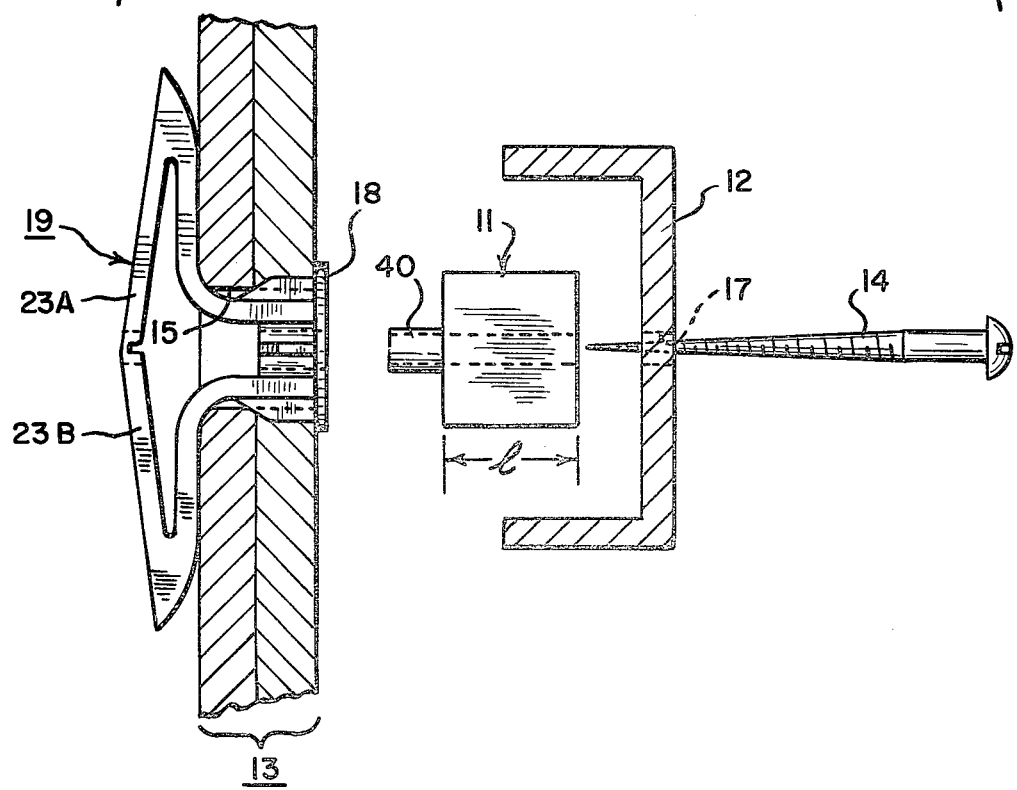

FASTENING ELEMENT WITH ANTI-JACKING DEVICE

BACKGROUND OF THE INVENTION

This invention relates to fastening elements and, more particularly, to a fastening element having an anti-jacking device for fastening a concave member to the surface of a second member.

Molded plastic fastening elements are rapidly gaining commercial acceptance both here and abroad. Such fastening elements typically comprise a head for disposition in one end of an opening, expansible locking means for location at the other end of the opening, and connector means extending therebetween. The connectors can be flexible spaced apart connectors connected to the expansible locking means at positions wherein they are radially outward of the openings in the expanded condition, such as is disclosed in U.S. Pat. No. 3,651,634 issued to the present inventor on Mar. 28, 1972. Alternatively, the connectors can be connected to the locking means at positions radially adjacent the openings such as is disclosed in applicant's copending application Ser. No. 826,865 filed Aug. 22, 1977.

In many uses, the fastening element in its collapsed condition is inserted through an opening of a first member, such as a sheet of wallboard, and opened to its expanded condition to fasten to the member. A second member is then attached to the first by a threaded screw extending through the second member and into the fastening element. A screw of appropriate length can also ensure that the expansible locking means remains in its expanded condition.

While such arrangement works well for many applications, problems are encountered when the second member fastened by the screw presents a concave surface facing the fastening element. In such instances, the turning of the screw tends to "jack" the fastener from the first member with the large mechanical advantage provided by the threaded screw and to pull the fastener into the open space bounded by the concave surface and the first member. Such problems are typically encountered, for example, in attempting to fasten concave shelving supports to walls. The result is a substantially weakened fastening arrangement potentially subject to premature failure.

Accordingly, there is a need for an improved fastening arrangement to permit fastening of concave members.

SUMMARY OF THE INVENTION

In accordance with the invention, a fastening arrangement and fastening element is provided for fastening together two or more members, at least one of which is concave with respect to the others. Fastened within an aperture in at least one of the members is a channeled fastening element with a longitudinally extending anti-jacking member and one or more additional members are attached to the fastening element by an elongated retaining element extending into the fastening element channel and locking therewithin. The anti-jacking member is proportioned to substantially extend between the concave member and the surface of the adjacent member to prevent jacking of the fastening element from the aperture.

BRIEF DESCRIPTION OF THE DRAWINGS

The nature, advantages, and various additional features of the invention will appear more fully upon consideration of the illustrative embodiments now to be described in connection with the accompanying drawings.

In the drawings:

FIGS. 1A and 1B are an exploded perspective view and a schematic cross section, respectively, showing a first embodiment of a fastening arrangement in accordance with the invention.

FIG. 2 is a cross-sectional view of an alternative embodiment of a fastening arrangement in accordance with the invention.

FIG. 3 is an exploded perspective view of an alternative embodiment of a fastening element in accordance with the invention.

For convenience of reference, the same structural elements are designated by the same reference numerals throughout the drawings.

DETAILED DESCRIPTION OF THE DRAWINGS

Referring to the drawings, FIGS. 1A and 1B show a fastening element 10 with an anti-jacking element 11 in an arrangement for fastening a concave member 12 to the surface of planar member 13 via a longitudinally extending retaining element 14 such as a threaded screw. Concave member 12 can be a support for a shelving bracket 16 and includes one or more openings 17. Planar member 13 can be a wall having an opening 15.

Fastening element 10 comprises a head 18, an expandible locking means 19, connecting means 20 extending therebetween, and longitudinally extending from the head away from the fastening element a collapse-resistant anti-jacking element 11 substantially extending from the surface of member 13 to the surface of concave member 12. Channel 21, dimensioned for receiving retaining element 14, extends longitudinally through element 11. But for the channel 21, anti-jacking element 11 is a substantially solid structure and has sufficient bulk that it will not collapse in the longitudinal direction under the forces created by the insertion and tightening of screw 14.

Except for the addition of anti-jacking element 11, the fastening element illustrated is of the type generally disclosed in the aforesaid U.S. Pat. No. 3,651,734. The connecting means comprise a pair of flexible spaced apart connectors 22A and 22B. The expandible locking means comprise a plurality of toggle members 23A and 23B with centrally located, pivotally connected ends 24A and 24B movable axially into a collapsed position between the connectors and movable across center away from the head to an expanded stable, over-center locking position. These fastening elements can be conveniently molded as integral plastic structures by injection molding in the expanded position.

In use, fastening element 10 is fastened to member 13 by insertion through opening 15 with the locking means 19 in the collapsed position. The locking means are then expanded to secure element 10 within opening 15 between the expanded locking means and head 20. Concave member 12 is then secured to both the fastening element and the wall by threading screw 14 through opening 17 into channel 21 wherein it is engaged. Anti-jacking device 11, by bracing the fastening element against the concave member 12, prevents "jacking" of the fastening element from the wall during the insertion of screw 14.

FIG. 2 is a perspective view of an alternative embodiment of a fastening element in accordance with the invention. Here the fastening element is of the type generally disclosed in applicant's aforementioned copending application Ser. No. 826,865, except that it also is provided with a hollow, elongated anti-jacking member 11. Here the connecting means is a longitudinally extending body portion comprising a pair of opposed pillar-like parts 30A and 30B. The locking means comprises a plurality of substantially rigid arms 31A and 31B pivotally connected to the pillar like parts at radial locations substantially adjacent or within the radius of the body. The use of the FIG. 2 embodiment in fastening a concave member to another is substantially identical to that shown and described in connection with FIG. 1.

FIG. 3 is an exploded cross-sectional view of a third embodiment of the invention wherein the fastening elements 10 and anti-jacking members 11 are fabricated separately and mechanically coupled as by a hollow projecting stud 40 adapted to fit tightly within channel 21. The advantage of this structure is that it permits the use of interchangeable anti-jacking members 11 of different lengths, 1, as is appropriate for the depth of the particular hollow member to be fastened.

While the invention has been described in connection with only a small number of specific embodiments, it is to be understood that these are merely illustrative of the many other specific embodiments which can also utilize the principles of the invention. Thus, numerous and varied devices can be made by those skilled in the art without departing from the spirit and scope of the present invention.

I claim:

1. A fastening device for fastening together two or more apertured members, at least one of which is concave with respect to the others, said device comprising:

a channeled fastening element for fastening within the aperture of at least one of said apertured members and comprising a channeled and enlarged outwardly flanged head, an expandable locking means, and connecting means extending between the head and the locking means, said head being adapted to abut its flange against the inner surface of said at least one apertured member when the fastening element is fastened within the aperture of said member, said fastening element including, in concentric channel alignment therewith, a channeled and otherwise solid longitudinally extending anti-jacking member in overlying abutment with the flanged head and substantially extending between the flanged head and said concave member, said anti-jacking member including means for attachment to said fastening element; and a longitudinally extending elongated retaining element for fastening said concave member to said fastening element by extending through the apertures of said concave member and the anti-jacking member and locking within the channel of the fastening element.

2. The device according to claim 1 wherein the retaining element comprises a threaded screw.

3. The device according to claim 1 wherein the fastening element and anti-jacking member are separately fabricated, mechanically coupled structures.

4. An improved fastening element of the type comprising a channeled and enlarged head, an expandable locking means, and connecting means extending between the head and the locking means, said fastening element being characterized by a channeled and otherwise solid collapse-resistant anti-jacking member in concentric channel alignment therewith and extending from said head longitudinally away from said fastening element member being in overlying abutment with said head and including means for attachment to said fastening element.

5. The fastening element of claim 4 wherein said expandable locking means comprise a plurality of toggle members with centrally located, pivotally connected ends movable axially into a collapsed position between the connectors and movable across center away from the head to an expanded, stable over-center locking position.

6. The fastening element of claim 4 wherein said expandable locking means comprise a plurality of substantially rigid arms pivotally connected to the connecting means.

7. The fastening element of claim 4 wherein said fastening element and said anti-jacking member are separately fabricated, mechanically coupled structures.

* * * * *

UNITED STATES PATENT AND TRADEMARK OFFICE
CERTIFICATE OF CORRECTION

PATENT NO. : 4,221,154

DATED : September 9, 1980

INVENTOR(S) : THOMAS W. McSHERRY

It is certified that error appears in the above-identified patent and that said Letters Patent are hereby corrected as shown below:

Column 2, line 6, "in connection with" should read

-- in detail in connection with -- .

Column 4, line 29 (Claim 4, third line from end),

"element member" should read -- element, said anti-jacking member -- .

Signed and Sealed this

Thirteenth Day of April 1982

[SEAL]

Attest:

Attesting Officer

GERALD J. MOSSINGHOFF

Commissioner of Patents and Trademarks